Dec. 19, 1944.  A. VIEHWEGER  2,365,156
SASH BALANCE
Filed July 20, 1939  3 Sheets-Sheet 3
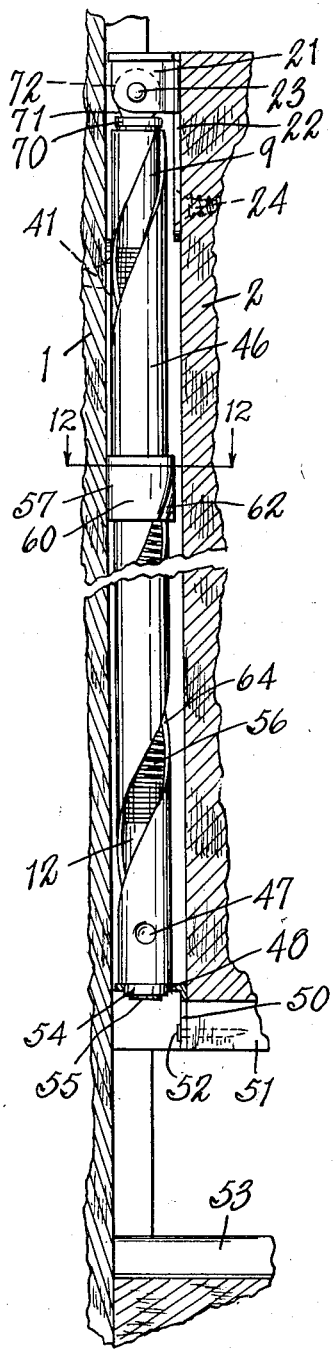
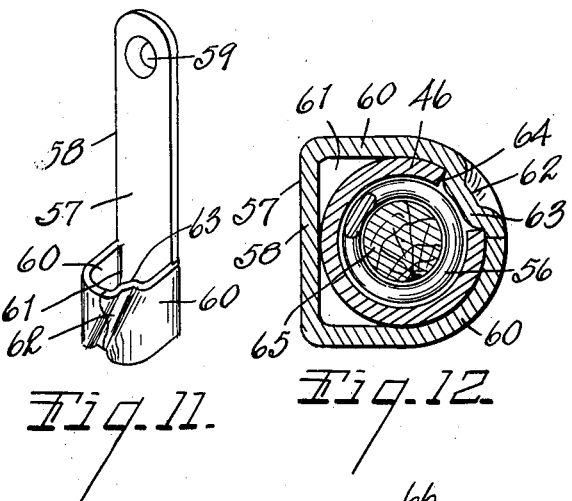
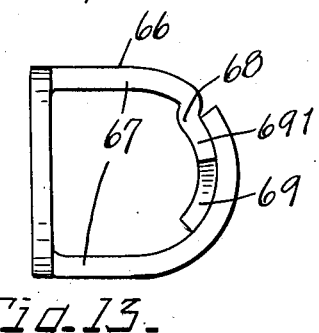
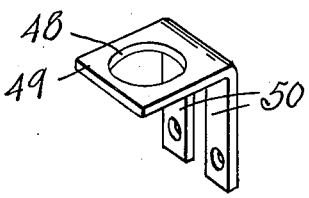
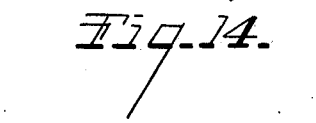
INVENTOR.
August Viehweger
BY Earl T. Chappell
ATTORNEYS Patented Dec. 19, 1944

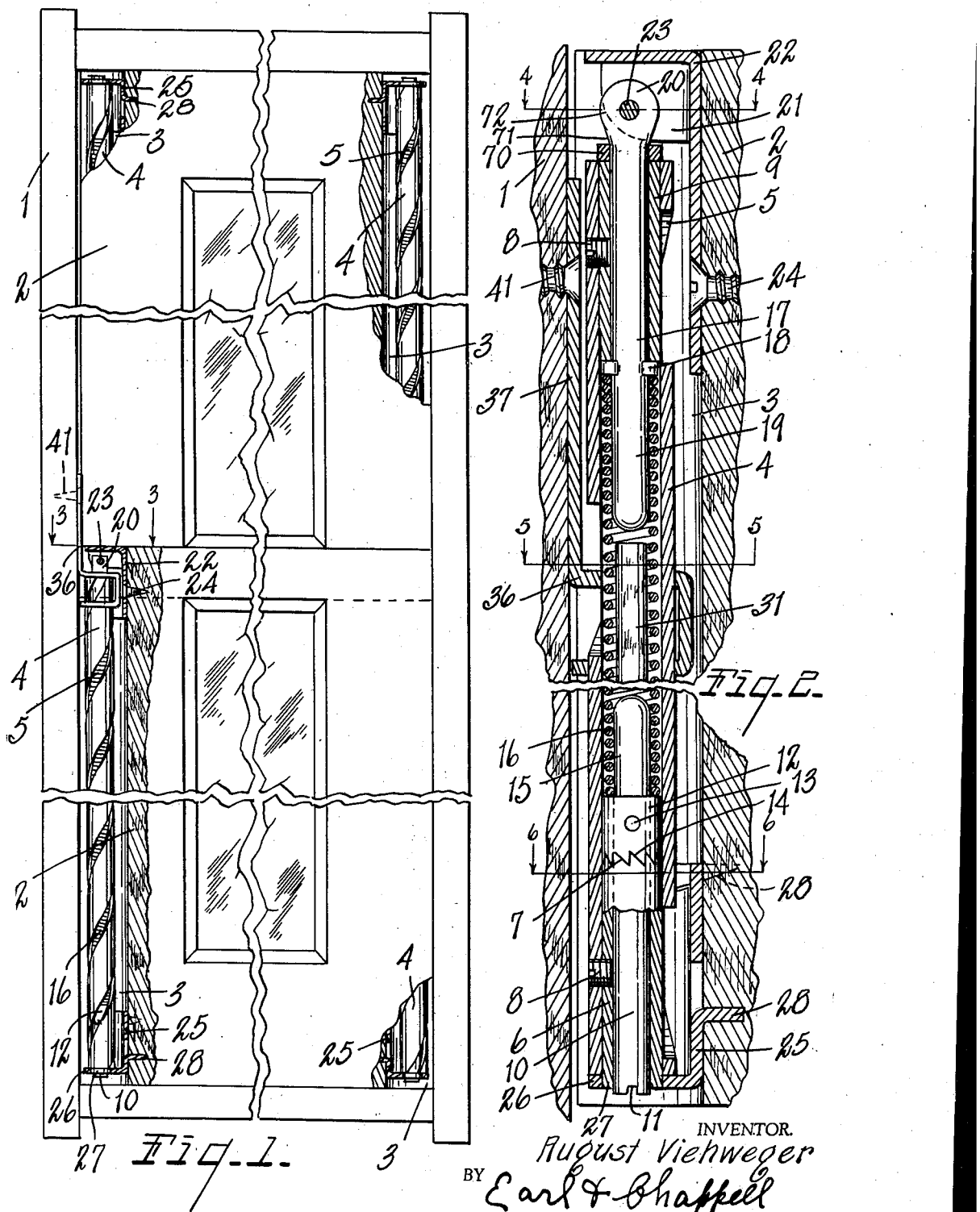

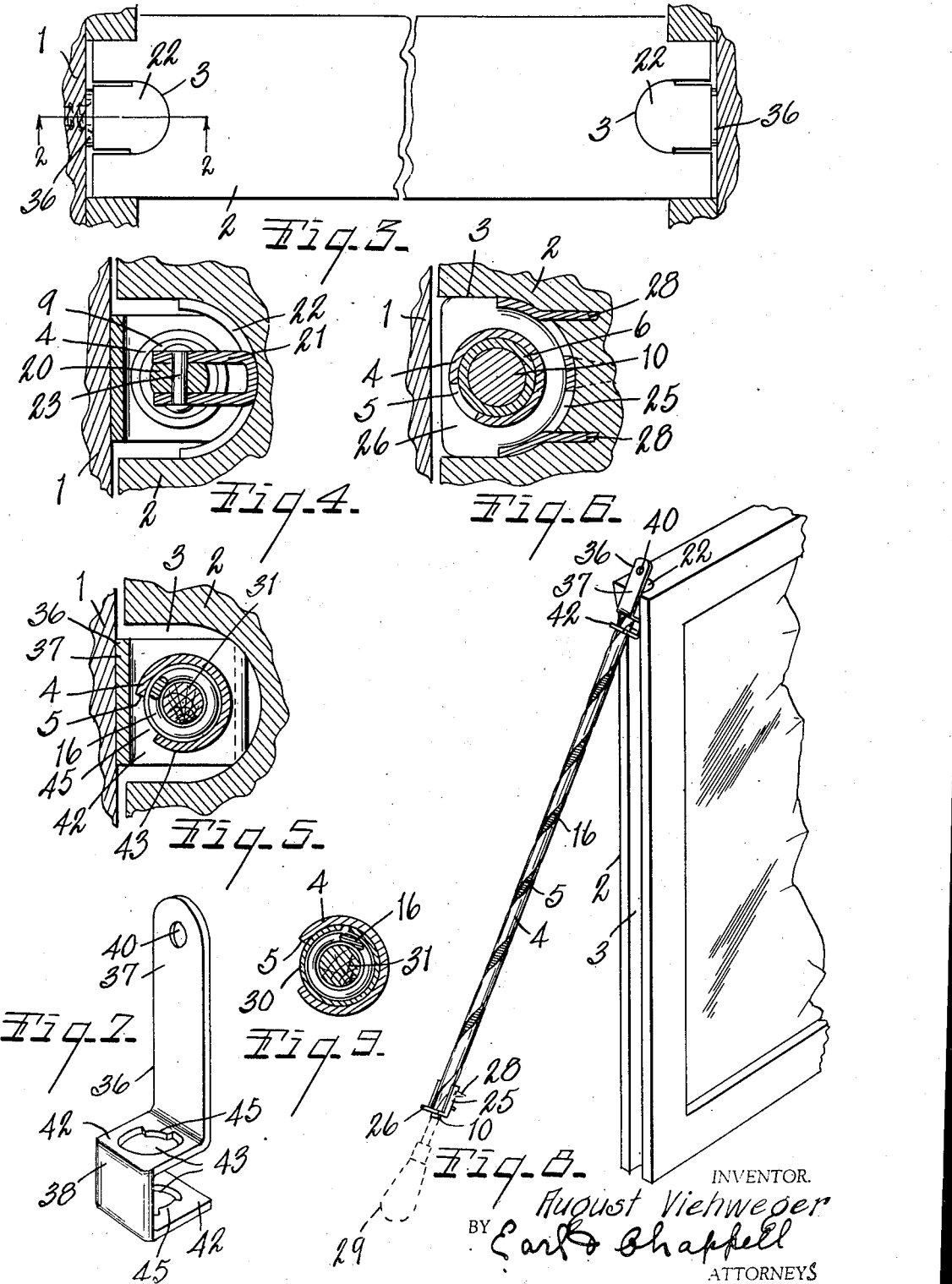

2,365,156

UNITED STATES PATENT OFFICE 2,365,156

SASH BALANCE

August Viehweger, Grand Rapids, Mich., assignor to Grand Rapids Hardware Company, Grand Rapids, Mich., a corporation of Michigan Application July 20, 1939, Serial No. 285,471

7 Claims. (Cl. 16—197)

The main objects of this invention are:

First, to provide a sash balance of the spring counterbalance type which may be quickly installed by workmen of ordinary skill and which is highly efficient, being adjustable to accommodate different weights of windows.

Second, to provide a sash balance which may be very economically produced both in the matter of its parts and the assembling thereof and which is strong and durable.

Objects relating to details and economies of the invention will appear from the description to follow. The invention is defined and pointed out in the claims.

Preferred embodiments of the invention are illustrated in the accompanying drawings, in which:

Fig. 1 is a fragmentary elevation of a window structure equipped with my improved sash balance.

Fig. 2 is a fragmentary view partially in vertical section on line 2—2 of Fig. 3.

Fig. 3 is a fragmentary horizontal section on line 3—3 of Fig. 1.

Fig. 4 is a fragmentary view mainly in section on line 4—4 of Fig. 2.

Fig. 5 is a fragmentary view in section on line 5—5 of Fig. 2.

Fig. 6 is a fragmentary section on line 6—6 of Fig. 2.

Fig. 7 is a perspective view of the torsion or nut member of my invention.

Fig. 8 is a fragmentary perspective view illustrating steps in the method of assembling, a tool for the tensioning of the spring being indicated by dotted lines.

Fig. 9 is a cross sectional view in which the tubular spiral element is provided with a liner constituting a cover for the spring and certain parts associated therewith within the spiral element.

Fig. 10 is a fragmentary view in vertical section illustrating a modified embodiment of my invention.

Fig. 11 is a perspective view illustrating a modified torsion or nut member employed in the assembly of Fig. 10 in accordance with my invention.

Fig. 12 is an enlarged view in section on line 12—12 of Fig. 10.

Fig. 13 is a plan view illustrating a still further modified embodiment of a torsion or nut member in accordance with my invention.

Fig. 14 is a perspective view illustrating a modified bottom bracket element as employed in the embodiment of Fig. 10.

It will be understood that in the accompanying drawings I have made no attempt to show the window frame and sash and other parts in their relative proportions and it will be appreciated that in practice these will be greatly varied although the sash balance units themselves are standardized in certain ranges for economy and uniformity.

In the accompanying drawings, 1 represents a window casing and 2, 2 the associated window sash. In Fig. 1, I have illustrated the window assembly with four of the counterbalance units, but as these are duplicates in structure only one need be described. It is desirable in practice to provide each of the sash balance units with two counterbalance units as this provides ease in operation, but it will be understood that a single unit may be used particularly on relatively small windows.

I have illustrated my sash balance units as seated in grooves 3 provided therefor in the edges of the window sash. It will be understood that, if desired, the sash balance units may be installed in the window casing, and sometimes that method of installation is preferred.

The sash balance of my invention comprises a tubular spiral element 4 formed of a strip of metal of uniform width and suitable length spirally twisted to provide a spiral groove or slot 5 extending from end to end thereof. By forming the element 4 of a strip of spirally twisted metal, all machine work is eliminated, such as is necessary where the groove is cut in the surface of a rod or tube, and the element can be very economically produced and with great uniformity.

In one end of this spiral element 4, I secure a bushing or sleeve 6 having ratchet teeth 7 on its inner end. This bushing is secured in the sleeve, in the embodiment illustrated, by means of the screw 8, but it will be understood that it might be spot-welded or riveted or otherwise secured. In the other end of the element 4, I secure the bushing or sleeve 9 by means of a screw 8. The securing of these parts together by means of screws is a matter of convenience in assembly and it also provides means for ready disassembly for purposes of repair of parts removal.

Within the bushing 6, I dispose a tension rod 10 having a kerf or slot 11 therein adapted to receive a screw driver or other like tool. This rod is provided with a ratchet head 12 sleeved thereon and secured thereto by means of the rivet or retaining pin 13. This ratchet head has suitable teeth 14 designed to coact with the teeth on the bushing 6, see Fig. 2.

The rod 10 projects inwardly beyond the head 12 to provide a clutch pin 15 with which one end of the spring 16 is engaged, the spring acting also to urge the ratchet head into engagement with the ratchet teeth on the sleeve.

In the other bushing 9, I arrange an anchoring rod 17 having abutment lugs 18 struck up therefrom to engage the inner end of the bushing, this rod having an anchoring pin extension 19 receiving the other end of the coiled spring.

These spring clutch pins are of such diameter that when the ends of the spring are forced thereon the coils of the spring surrounding the clutch pins are in clutching engagement therewith so that no further securing means for the spring to the anchoring rod and the tension rod are required.

The anchoring rod has a flattened outer end portion 20 disposed between the ears 21 of the attaching bracket 22 and secured to these ears by means of the pivot 23 so that the spiral element with the parts arranged therein may be swung outwardly to permit the securing of the bracket in the bottom of the groove as by means of the screw 24. It will be observed that the bottom of the groove or channel 3 is, in the embodiment illustrated, curved in cross section and the bracket is correspondingly curved to fit therein, see Fig. 4.

To further anchor the unit, I provide a second bracket 25 which, in the embodiment illustrated, has an arm 26 with a hole therein receiving the projecting end 27 on the bushing 6, see Fig. 2. This bracket 25 is provided with attaching prongs 28 which may be driven into the bottom of the groove or channel 3.

In assembling, the bracket 22 is first attached to the window sash, the spring properly tensioned as by means of the screw driver 29, see Fig. 8, and the unit is then swung into the channel and the bracket 25 secured merely by driving its prongs into the sash. Where it is desired to completely house the spring, I provide a liner 30 for the element 4, see Fig. 9, this liner being preferably formed of a piece of sheet metal rolled into cylindrical form, although it may be a piece of drawn tubing. However, forming the liner of a strip of sheet metal is quite satisfactory and is much more economical than the drawn tubing.

To prevent any buckling of the spring under tension and to render the operation of the windows more silent, I provide a silencing rod 31 which is disposed within the spring between the ends of the clutch pins. This is effective in preventing buckling and clicking of the coils against each other.

In Fig. 7, I illustrate my improved torsion member 36. This is formed in U shape with a bracket arm 37 extending from one end thereof and perforated at 40 to receive the attaching screw 41. This torsion member is secured to the window casing so that when the windows are closed, the member is at one end of the spiral element. The arms 42 are provided with holes 43 slidably receiving the element 4 and have tooth-like groove engaging lugs 45 adapted to engage and travel in the groove 5. These lugs 45 in the two arms of the torsion member are angularly disposed relative to each other so that they engage to accommodate the spirals of the groove. This provides a very effective torsion member and one which can be economically produced and is subject to relatively little wear. It will be understood that as the window sash is moved up and down, the member 4 is rotated, the tension on the spring being varied to some extent to compensate for the movement of the sash.

In Fig. 10, I illustrate a modified embodiment of my invention, which is generally similar to that illustrated in Fig. 2, differing therefrom in certain structural details. In the embodiment of Fig. 10, the tubular spiral element 46 is secured to the tension rod by upsetting the element at 47. The spiral element is rotatably supported in a journal aperture 48 in a modified bracket member 49 (see also Fig. 14), which bracket has a pair of legs 50 secured to either side of a weather-strip receiving groove 51 by means of nails 52. The weatherstripping or sealing tongue receivable in the groove 51 is indicated in Fig. 10 by the reference numeral 53 and it will be apparent that the spaced legs 50 straddle the latter when the window is closed. The lowermost end of the ratchet bushing or sleeve is indicated by the reference numeral 54 while the kerfed end of the tension member or rod is indicated by the reference numeral 55. By adjusting this last named member, the tension of the spring 56 may be adjusted.

The embodiment under consideration includes a novel torsion member 57 which is illustrated in Fig. 11, consisting of a bracket arm 58 perforated at 59 to receive an attaching screw which is illustrated in dotted lines in Fig. 10, and the bracket has a pair of lateral arms 60 which are brought together on the front of the bracket into meeting relation to provide a tension rod receiving space 61, the so disposed arms being then indented as at 62 in an inclined or generally spiral manner to provide a groove engaging abutment or projection 63 engageable with the spiral groove 64 in the tubular element 46 throughout the vertical dimension of arms 60 and causing the tubular element to rotate as the sash is raised and lowered. The details of this construction are likewise illustrated in Fig. 12, wherein the reference numeral 65 designates a silencing rod corresponding to that denoted 31 in the embodiment of Figs. 1 to 9.

In Fig. 13, I illustrate a still further modified embodiment of torsion member 66, wherein the arms 67 thereof are overlapped with the innermost thereof offset at 68 along a vertically inclined or spiral line. The inclined shoulder formed by this offsetting, along with the inclined or spirally formed end of the arm 69 provides a groove engaging abutment or element 691 coacting with the groove in the tension member 46 in the same manner as the projection 63 in Fig. 12.

The modified torsion members of Figs. 11 and 13 are readily formed by using a suitable die and compressor and afford a substantial groove engaging lug or abutment coating with the groove of the tension member throughout a substantial axial distance therein to effect a smooth and frictionless action of the parts when the sash is raised and lowered. They are very inexpensively made and are amply strong to perform their intended operation.

In Fig. 10, I illustrate a collar or washer 70 which is preferably placed around the anchoring pin 71 to prevent the tension member 46 from becoming jammed against the rounded and enlarged head 72 of the anchoring member, acting as an end thrust member for the spirally grooved element.

I have illustrated and described my improvements in embodiments thereof which I have found highly satisfactory. I have not attempted to illustrate or describe certain modifications and adaptations which I contemplate as it is believed that this disclosure will enable those skilled in the art to embody or adapt my improvements as may be desired.

Having thus described my invention, what I claim as new and desire to secure by Letters Patent, is:

1. In a sash balance, the combination of a tubular element having a spiral groove, bushing secured within the ends of said element, one of the bushings being provided with ratchet teeth at its inner end and projecting at its outer end from said element to receive a supporting bracket, a tension rod disposed within said bushing and having a ratchet head coacting with said ratchet teeth, said tension rod being extended beyond its ratchet head to provide a spring clutch pin and being adapted at its outer end to receive an adjusting tool, an anchoring rod having a mounting bracket pivotally connected thereto disposed within the other bushing and projecting therefrom to provide a spring clutch pin, a coiled spring arranged within said element with its ends in clutching engagement with said clutch pins, said spring acting to urge said ratchet head into engagement with said ratchet teeth on said bushing, a bracket-like supporting element having an opening therein receiving the projecting end of said bushing provided with the ratchet teeth, said last named element being provided with securing prongs, and a torsion member coacting with said element and provided with a groove engaging member.

2. In a sash balance, the combination of a tubular element provided with a spiral groove, bushings secured within the ends of said element, one of the bushings being provided with ratchet teeth at its inner end, a tension rod disposed within such bushing and having a ratchet head coacting with said ratchet teeth, said tension rod being extended beyond its ratchet head to provide a spring clutch pin and being adapted at its outer end to receive an adjusting tool, an anchoring rod provided with a mounting bracket disposed within the other bushing and projecting therefrom to provide a spring clutch pin, a coiled spring arranged within said element with its ends in clutching engagement with said clutch pins, and means adapted to be fixedly secured to a window casing engageable with said spiral groove to rotate the element upon axial shifting thereof.

3. In a sash balance, the combination of a tubular element having a spiral groove or slot, bushings secured within the ends of said element, one of the bushings being provided with ratchet teeth at its inner end, a tension rod disposed within such bushing and having a ratchet head coacting with said ratchet teeth, the outer end of said tension rod being adapted to receive an adjusting element, an anchoring rod having a mounting bracket pivotally connected thereto disposed within the other bushing, a coiled spring arranged within said element with its ends connected to said tension and anchoring rods and acting to urge the ratchet head and teeth into engagement, and a bracket-like support disposed at the end of the element provided with the tension rod, said support being provided with securing prongs.

4. In a sash balance, the combination of a tubular element having a spiral groove or slot, bushings secured within the ends of said element, one of the bushings being provided with ratchet teeth at its inner end, a tension rod disposed within such bushing and having a ratchet head coacting with said ratchet teeth, the outer end of said tension rod being adapted to receive an adjusting element, an anchoring rod having a mounting bracket connected thereto disposed within the other bushing, and a coiled spring arranged within said element with its ends connected to said tension and anchoring rods and acting to urge the ratchet head and teeth into engagement.

5. In a sash balance, the combination of a rotatable element having a spiral groove, and a fixed torsion member having an abutment inclined parallel to the inclination of, and engaging in the groove of said element to cause relative rotation of the member and element as a consequence of relative longitudinal movement thereof, said torsion member comprising a single member of sheet metal of axially restricted dimension having an attaching bracket portion and a U-shaped portion connected thereto to provide a recess for receiving the rotatable element, said last named portion having an indentation upset therein to provide said abutment engageable in said groove.

6. In a sash balance, the combination of a rotatable element having a spiral track, and a torsion member having means engaging the track of said element to cause relative rotation of the member and element as a consequence of relative longitudinal movement thereof, said torsion member comprising a single member of sheet metal of axially restricted dimension having an attaching bracket portion and a portion having a recess for encircling and receiving the rotatable element and being bendably deformed on a line generally parallel to the inclination of said spiral track; to provide said means engageable with said track.

7. A sash balance comprising relatively longitudinally movable tubular and torsion members, said tubular member having a spiral groove therein, said torsion member comprising a strap metal portion of relatively restricted axial dimension encircling said tubular member and extending parallel thereto and having an elongated groove engaging lug indented therein to lie at an angle to the axis of the tubular member said lug being engageable in said groove to rotate the tubular member upon relative longitudinal movement of the members.

AUGUST VIEHWEGER.